Aug. 4, 1931.　　　A. JORDAHL　　　1,816,855
FILTER APPARATUS
Filed June 12, 1926　　2 Sheets-Sheet 1
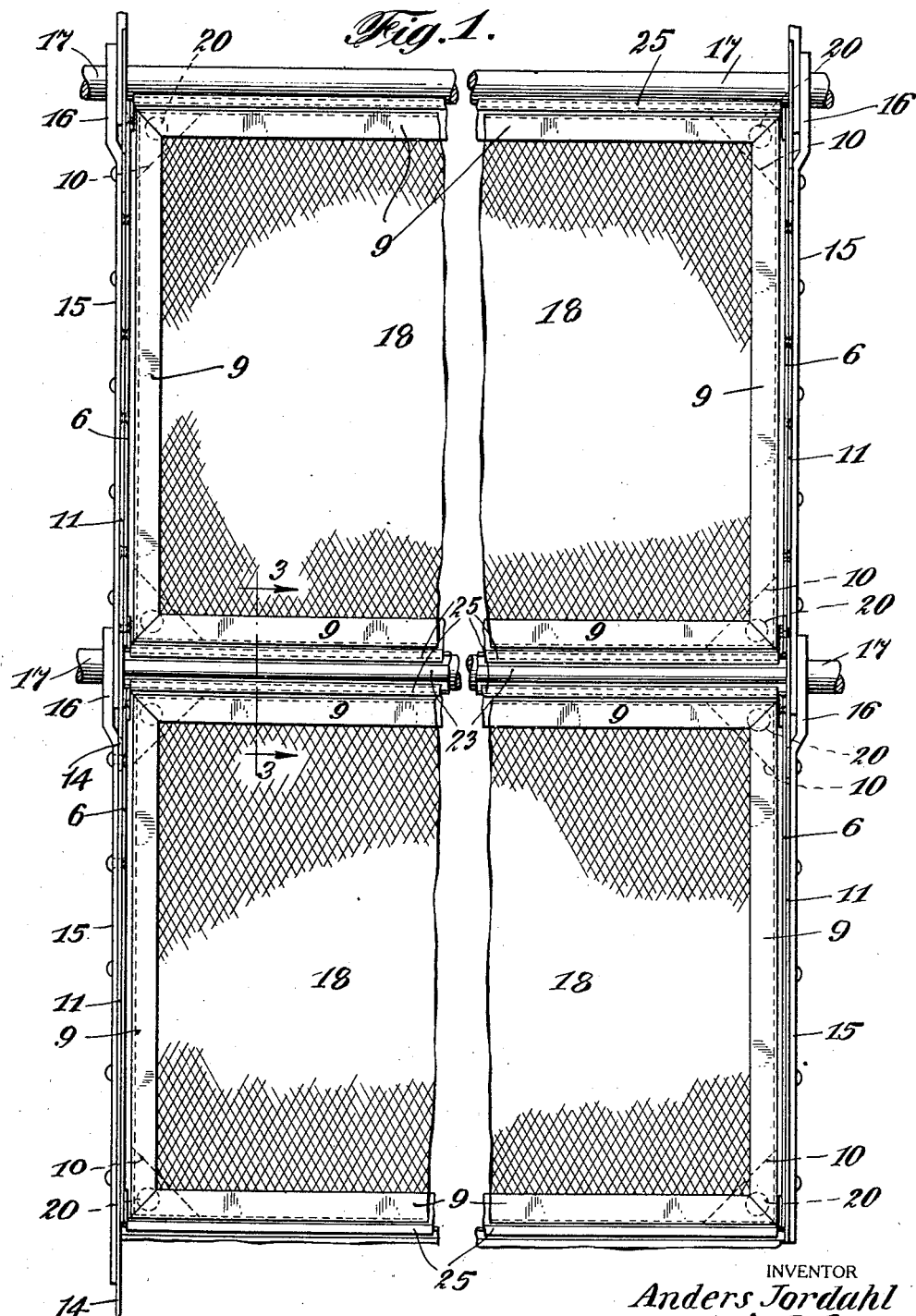
INVENTOR
*Anders Jordahl*
BY *C. P. Goepel*
his ATTORNEY Aug. 4, 1931.  A. JORDAHL  1,816,855
FILTER APPARATUS
Filed June 12, 1926  2 Sheets-Sheet 2
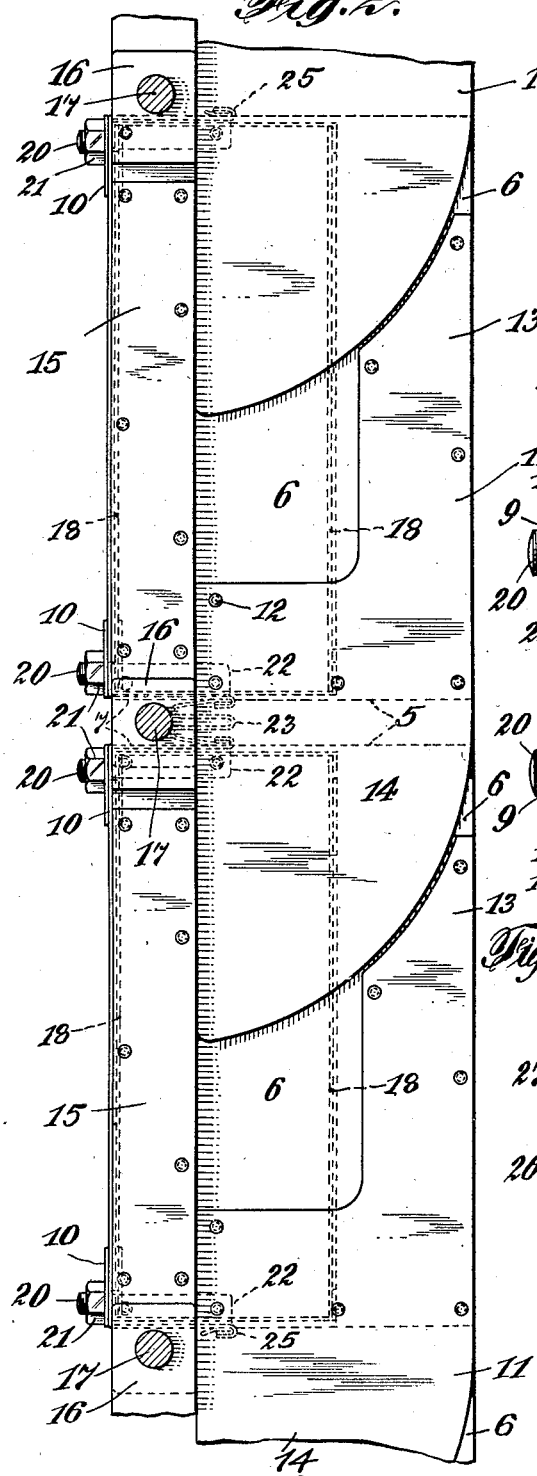
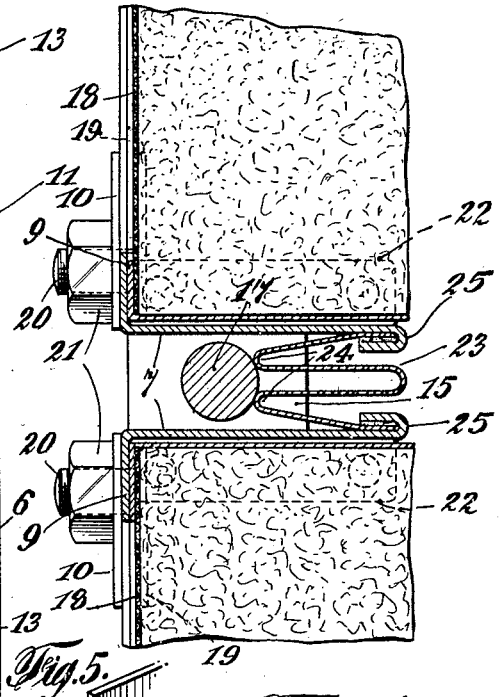
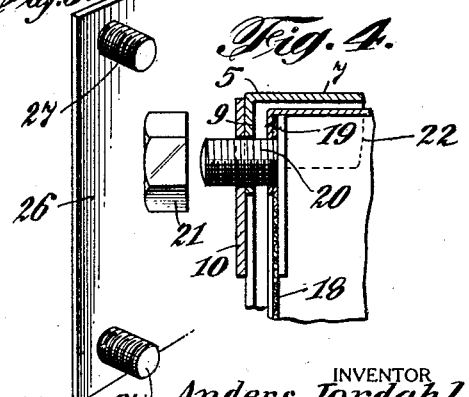
INVENTOR
*Anders Jordahl*
BY *C. P. Goepel*
his ATTORNEY Patented Aug. 4, 1931

1,816,855

UNITED STATES PATENT OFFICE

ANDERS JORDAHL, OF NEW YORK, N. Y., ASSIGNOR TO AMERICAN AIR FILTER COMPANY, INC., OF LOUISVILLE, KENTUCKY, A CORPORATION OF DELAWARE

FILTER APPARATUS

Application filed June 12, 1926. Serial No. 115,501.

This invention relates to filter apparatus, and more particularly to an apparatus for filtering air and gases of the character shown and described in my prior application for patent, Serial No. 107,118, filed May 6, 1926, wherein there is provided an endless movable chain of cells or holders for the filter medium intercepting the path of flow of the air or gas.

It is the primary object and purpose of my present improvements to provide greater flexibility in the articulated chain of filter cells together with an improved barrier means of great durability yieldable in the relative angular movement of adjacent filter cells and effectively preventing the passage of unfiltered air therebetween.

It is also an important object of the present invention to provide holding frames for the individual cells and means whereby the cells may be demountably secured in said frames so that the individual cells may be selectively removed from the articulated chain of cell frames for thorough cleaning when necessary. I may also provide a detachable plate to be substituted for the removed filter cell to close the open side of said frame and prevent the passage of the unfiltered air therethrough so that the apparatus with the remaining filter cells may continue in operation, in case extra replacement filter cells are not available.

With the above and other objects in view, the invention consists in the improved filter apparatus, and in the form, construction and relative arrangement of its several parts as will be hereinafter more fully described, illustrated in the accompanying drawings, and subsequently incorporated in the subjoined claims.

In the drawings, wherein I have illustrated one simple and satisfactory embodiment of the invention and in which similar reference characters designate corresponding parts throughout the several views,—

Figure 1 is a fragmentary rear elevation showing two of the articulated frames with the filter cells mounted therein;

Fig. 2 is a side elevation thereof;

Fig. 3 is an enlarged detail transverse section taken on the line 3—3 of Fig. 1;

Fig. 4 is an enlarged fragmentary sectional view illustrating the manner of demountably securing the filter cells in the frames, and Fig. 5 is a fragmentary perspective view of one of the detachable plates for closing the open side of the cell frame.

In the accompanying drawings, I have illustrated only so much of the apparatus as is necessary for a full disclosure of the novel features of the present invention. A complete installation is shown and described in my prior patent application to which reference may be had. In this former construction the cells containing the filter medium are directly connected or articulated with each other in the form of an endless travelling chain. In my improved construction however, I propose to demountably secure the individual filter cells in separate frames. These frames generally indicated at 5 may be stamped or otherwise formed from sheet metal of proper gauge, and as shown in Fig. 1 of the drawings are of horizontally elongated form. The opposite side walls 6 of each frame are relatively wide in comparison with the upper and lower end walls 7 which are comparatively narrow. At the front side of the frame through which the air enters, the walls 6 and 7 thereof are provided with the inturned flanges 9 connected at their ends by corner plates 10 welded or otherwise secured to said frame flanges.

To the outer faces of the side walls 6 of each frame the plates 11 are riveted as at 12, each of said plates preferably having a reduced or narrowed portion 13 extending longitudinally along one edge of the wall 6 while the other wider end portion 14 of said plates projects longitudinally beyond one end of the frame and overlaps upon the side wall 6 of an adjacent frame. These plates 11 on the several cell frames are wholly positioned in a common plane, no bends being formed therein.

To the side walls 6 of each frame and extending along the longitudinal edges thereof having the inturned flanges 9, the relatively wide link bars 15 are securely riveted or otherwise fixed, the ends of said link bars projecting beyond the opposite ends of the cell frame and one end of each link bar being angularly offset as at 16 to lap upon the corresponding link bar of an adjacent cell frame. These engaged ends of the link bars are apertured to receive the ends of the pivot rods 17 which carry suitable rollers for engagement by upper and lower sprocket wheels as revealed in my pending application above identified. Thus, these cell holding frames are articulated with each other in an endless chain for free relative angular movement as they pass around the sprockets.

The filter cells generally indicated at 18 which contain the filter medium may be of any approved construction, and are of such dimensions that they may be readily fitted within the frames 5. These filter cells are also each provided with internal corner plates 19 at their ingress sides each of which is provided with a threaded stud 20 adapted to be engaged through openings formed in the frame flanges 9 and the corner plates 10 thereof, said studs receiving the clamping nuts 21 whereby the filter cells may be rigidly fixed or secured in the respective frames. Whatever the remaining structural details of the filter cells may be, the term "filter cell" as used in this description and in the claims is to be understood as meaning a box-like structure having foraminous side walls between which a compact mass of filtering medium or material is confined.

The upper and lower end walls 7 of the cell receiving frames are provided at their ends with inturned flanges indicated at 22 which are securely riveted to the side walls 6 of the frame and for the purpose of preventing the passage of unfiltered air between these cell receiving frames, I provide a thin sheet metal strip indicated at 23 having a plurality of bends or convolutions 24 formed therein and extending substantially throughout one dimension of the cell frames. The edges of this barrier strip of sheet metal are secured in the bent-over edges 25 of the frame walls 7. These bends of the frame walls provide reinforcements therefor and constitute spacers extending between the opposite side links 15 of the chain. By providing the series of bends or convolutions 24 in the sheet metal barrier strip which extend from the edges of the wall 7 substantially to the pivot rods 17, the flexing or stretching of said plate is divided between said bends and as the relative angular movement of the link chains in passing around the sprockets does not exceed 45°, this stretching or elastic strain on the sheet metal barrier strip is reduced to a minimum, and is so slight that it will never exceed the fatigue limit of the metal stock. The pivot rods 17 effectually prevent the disengagement or detachment of the edges of the barrier plates 23 from the bent-over edges 25 of the frame walls 7.

From the foregoing description considered in connection with the accompanying drawings, the several improvements which I have made in the apparatus disclosed in my pending application will be readily understood. By demountably arranging the individual cells in the separate frames, any one cell can be easily and quickly removed when the filtering material therein requires a thorough washing or cleansing by simply removing the nuts 21 and a clean replacement filter cell may be substituted therefor. In the event that such replacement cells are not available, the open side of the frame 5 from which the cell has been removed may be closed by means of the plate 26 shown in Fig. 5 of the drawings which is provided at its corners with threaded studs 27. This plate may be engaged against the inner sides of the frame flanges 9 and the studs 27 positioned through the openings therein to receive the clamping nuts 21. Thus, the articulated chain of cells may be continued in operation with the assurance that no unfiltered air will pass through the frame from which the cell has been removed. It is of course, understood that the side walls 6 of the frames and the plates 11 attached thereto travel in suitable guides on the housing or casing walls for the apparatus as shown in my pending application so that the passage of unfiltered air around said cell receiving frames will be prevented. The flexible convolute barrier strips 23 between the cell frames will also preclude the passage of unfiltered air between the opposed ends of these frames. Therefore, it will be apparent that all air entering to the inner side of the filter cell chain must pass through the filtering material in the cells. This material may be of any desired character, such as fine metal strands coated with a suitable adhesive agent such as oil or viscosine whereby the finest dust particles contained in the air will be removed therefrom.

In the above description, I have referred to an embodiment of my present improvements which has given excellent results in practice. Nevertheless, it is apparent that the several novel features thereof might be incorporated in various other alternative structures, and I accordingly reserve the privilege of resorting to all such legitimate changes in the form, construction and relative arrangement of the several parts as may be fairly incorporated within the spirit and scope of the invention as claimed.

I claim:

1. In filter apparatus, a series of rectangular frames, means linking said frames together for relative angular movement, a filter medium containing cell for each frame, and means for demountably securing said cells in the respective frames with each marginal portion of the cell in supported contact with a part of the frame.

2. In filter apparatus, a series of frames, means linking said frames together for relative angular movement, a filter medium containing cell for each frame, means for demountably securing said cells in the respective frames, and a flexible barrier means connecting the adjacent frames with each other to prevent the passage of air therebetween.

3. In filter apparatus, a series of frames, means linking said frames together for relative angular movement, a filter medium containing cell for each frame, means for demountably securing said cells in the respective frames, and a convoluted flexible sheet metal barrier strip secured to the opposed walls of adjacent cell frames to prevent the passage of air therebetween.

4. In filter apparatus, a series of frames, means linking the frames together for relative angular movement, plates secured to opposite sides of each frame extending longitudinally therefrom and lapping upon the sides of an adjacent frame, flexible barrier means interposed between adjacent frames and extending longitudinally thereof between said plates to prevent the passage of air between the frames, a filter medium containing cell for each frame, and means for demountably securing the cells in the respective frames.

5. In filter apparatus, a series of frames, means linking the frames together for relative angular movement, a convoluted strip of sheet metal arranged between adjacent frames and having its edges secured to the opposed walls thereof, a filter medium containing cell for each frame, and means for detachably mounting said cells in the respective frames.

6. In filter apparatus, a series of frames, means linking the frames together for relative angular movement including pivot rods extending between the adjacent frames, a convoluted flexible metallic barrier strip arranged between the adjacent frames, the opposed walls of said frames having their edges bent over upon the edges of said barrier strip and the spaced convolutions of said barrier strip extending adjacent to the pivot rod, a filter medium containing cell for each frame, and means for detachably securing said cells in the respective frames.

7. In filter apparatus, a series of filter cell receiving frames, means for linking said frames together for relative angular movement, a flexible element connecting the adjacent frames to prevent the passage of air therebetween, a filter cell for each frame, means for detachably mounting the filter cells in the respective frames, and means for closing the respective frames to prevent the passage of air therethrough when the filter cell is removed.

8. In filter apparatus, a series of frames, means linking the frames together for relative angular movement, connecting means between the adjacent frames to prevent the passage of air therebetween, a filter cell for each frame provided with a plurality of threaded studs, and said frame having openings therein to receive said studs, and clamping nuts for engagement with said studs to detachably clamp the filter cell in the frame.

9. In filter apparatus, a series of frames, means linking the frames together for relative angular movement, connecting means between the adjacent frames to prevent the passage of air therebetween, a filter cell for each frame, means for detachably mounting the filter cells in the respective frames, and a closure plate adapted to be substituted for the filter cell to prevent the passage of air through said frame when the filter cell is removed.

10. In filter apparatus, a series of frames, means linking the frames together for relative angular movement, connecting means between the adjacent frames to prevent the passage of air therebetween, a filter cell for each frame, means for detachably mounting the filter cells in the respective frames, said means including threaded studs carried by the filter cell, said frame having flanges provided with openings to receive said studs, nuts adapted to be threaded upon said studs to detachably secure the filter cell in the frame, and a closure plate for the frame having threaded studs adapted to be engaged through said openings to receive said nuts when the cell is removed to thereby prevent the passage of air through the frame.

11. In filter apparatus, filter cell carrying members, and resiliently yieldable means connecting adjacent members with each other and permitting of their relative angular movement.

12. In filter apparatus, a series of filter cell carrying members, and a resiliently yieldable metallic strip connecting the adjacent members with each other for relative angular movement and constituting means preventing the passage of unfiltered air between said members.

13. In filter apparatus, a series of filter cell carrying frames for independently removably supporting a plurality of filter cells, means pivotally connecting said frames with each other, and a single resilient element arranged between and connecting the adjacent frames to each other and permitting of their relative angular movement.

14. In filter apparatus, a series of frames adapted to receive and independently support filter medium containing cells, means linking said frames together for relative angular movement, and a single yieldable element connecting the adjacent frames with each other permitting of relative angular movement thereof and constituting a barrier preventing the passage of unfiltered air between said frames.

15. In filter apparatus, a series of cells each containing a filter medium and means for mounting said cells for relative movement, and means connecting adjacent cells to prevent the passage of the substance to be filtered between same while permitting of their relative movement.

16. In filter apparatus, spaced filter units, frictionally held means extending across the space between units to prevent air passing therethru, the removal of said means necessitating movement in one direction at least, and means normally interposed between said units to prevent the removal of said frictionally held means.

17. In filter apparatus, spaced filter units having groove providing lugs on their adjacent ends, means adapted to be slipped and frictionally held in said grooves, said means extending across the space between said units so as to prevent air passing therethru, and means normally positioned to prevent the removal of said air blocking means.

18. In filter apparatus, spaced filter units and resiliently yieldable means connecting adjacent units so as to block the passage of air between said units, said means being frictionally held in place, and means for normally preventing the removal of said yieldable means.

In testimony that I claim the foregoing as my invention, I have signed my name hereto.

ANDERS JORDAHL.